No. 857,010. PATENTED JUNE 18, 1907.
O. T. BEATTY.
AIR BRAKE.
APPLICATION FILED AUG. 7, 1905.
2 SHEETS—SHEET 1
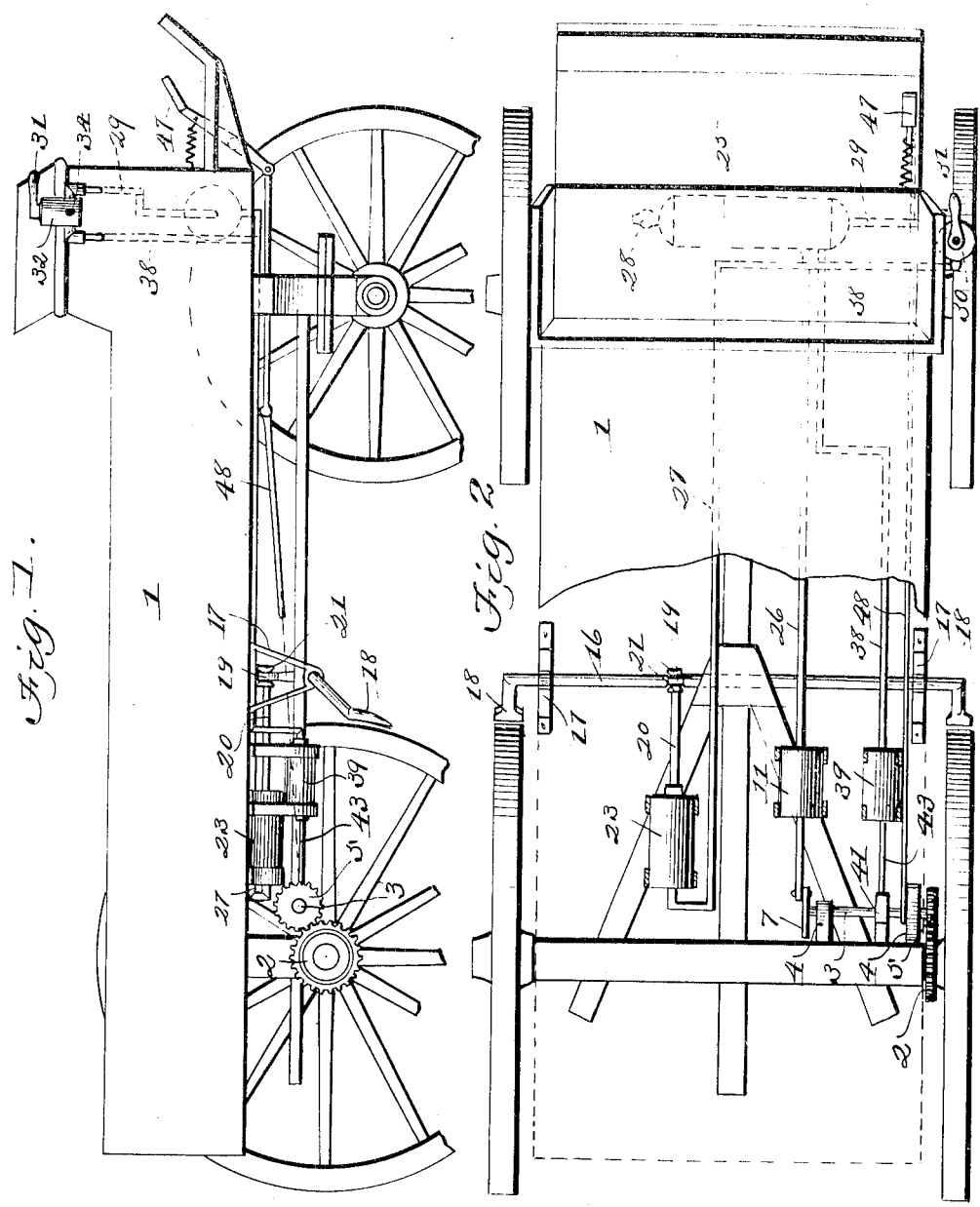
WITNESSES:
INVENTOR
O. T. Beatty.
BY
ATTORNEYS No. 857,010. PATENTED JUNE 18, 1907.
O. T. BEATTY.
AIR BRAKE.
APPLICATION FILED AUG. 7, 1905.
2 SHEETS—SHEET 2
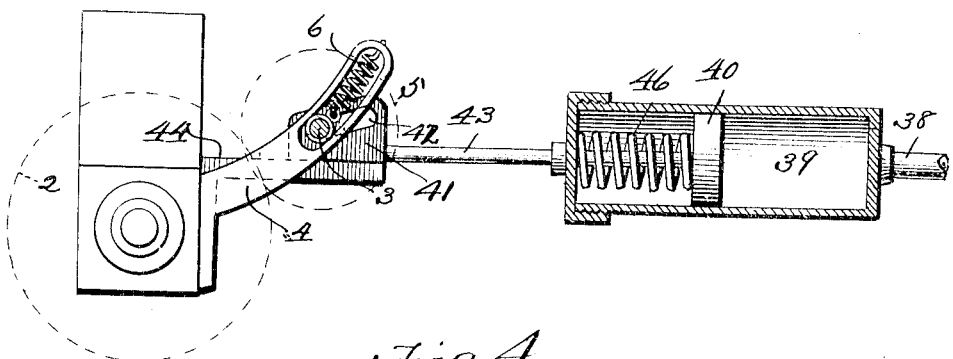
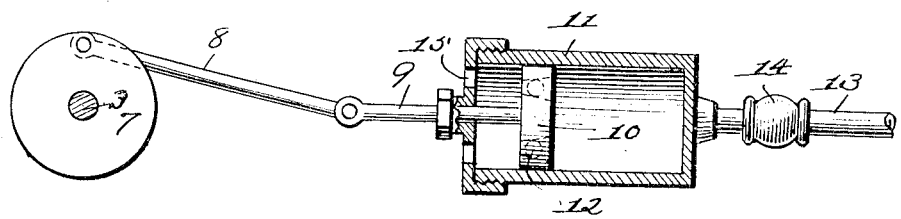
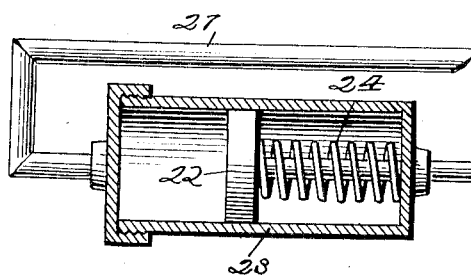
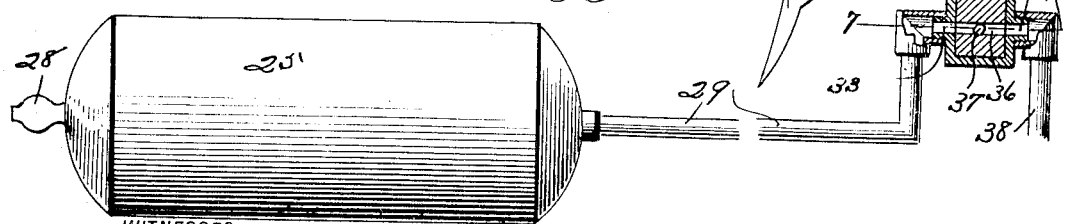

UNITED STATES PATENT OFFICE.

ORAH T. BEATTY, OF EAST BRADY, PENNSYLVANIA, ASSIGNOR OF ONE-THIRD TO T. S. FILSON, OF EAST BRADY, PENNSYLVANIA.

AIR-BRAKE.

No. 857,010.  Specification of Letters Patent.  Patented June 18, 1907.

Application filed August 7, 1905. Serial No. 273,205.

*To all whom it may concern:*

Be it known that I, ORAH T. BEATTY, a citizen of the United States, residing at East Brady, in the county of Clarion and State of Pennsylvania, have invented a new and useful Improvement in Air-Brakes, of which the following is a specification.

This invention relates to air brakes designed to be attached to vehicles and the object of the invention is to set the brakes by means of compressed air, instead of by a lever operated by the foot or hand.

The invention also consists of the novel features of construction hereinafter described, pointed out in the claims, and shown in the accompanying drawings, in which, Figure 1 is a side elevation of a wagon with my brake attached thereto. Fig. 2 is a plan view of the braking apparatus, the body of the wagon being partly broken out, Fig. 3 is a view partly in side elevation and partly in section illustrating a safety governor. Fig. 4 is a detail view partly in section showing the air compressor. Fig. 5 is a detail view showing the brake cylinder in section and attached parts in elevation. Fig. 6 is a view in side elevation of the reservoir with the controlling valve in section and the connecting pipe partly broken away. Fig. 7 is a section on the line 7—7 of Fig. 6.

In these drawings 1 represents the wagon having a gear wheel 2, upon one axle, and in the drawing I have shown the gear wheel 2, as applied to the rear axle. The shaft 3 is slidably journaled in longitudinally slotted and curved bearings 4, and at one end carries a gear wheel 5 which is adapted to be thrown into and out of engagement with the gear wheel 2, by the sliding of the shaft 3 in the bearing 4. As shown in Fig. 3, the coil spring 6, is connected at one end to the bearing at the opposite end to the shaft 3 and normally tends to hold the gear wheel 5 in steady engagement with the gear wheel 2. Upon the opposite end of the shaft 3, is a disk 7 to which is pivoted a link 8, which is also pivoted to the end of a piston rod 9 which operates a piston 10 working in a cylinder 11. The piston 10 is provided with suitable check valves 12 of any desired construction and so arranged that as the piston 10 is moved forward, the air within the cylinder 11, will be compressed and forced through a pipe 13, which is also provided with a check valve 14, which prevents the air passing back to the cylinder 11. On the return or rear stroke of the piston 10 the valves 12 will admit air into the cylinder, the rear cylinder head being perforated as shown at 15.

A brake shaft 16, is journaled in suitable brackets 17, and has angled end portions which carry brake shoes 18. Upon the shaft 16, is rigidly secured an arm 19 which is slotted and a piston rod 20, has an end portion working in the slot of the arm 19 and adjacent the said arm the piston rod 20 carries semi-spherical enlargements 21, arranged upon opposite sides of the arm and bearing upon the same. The piston rod 20 is connected to a piston 22, which works in a brake cylinder 23 and a coil spring 24, encircles the piston rod 20 and bears at one end against a head of the cylinder and at the opposite end against the piston 22.

Under the wagon is also arranged a reservoir 25, and an air pipe 26, leads from the air compresser 11, to the said reservoir and a pipe 27, leads from the reservoir to and from a valve 28 to the rear end of the brake cylinder 23, and air passing through the pipe 27, will force the piston 22, forward and by rocking the arm 19 will apply the brake 18 to the wheels of the vehicle.

A suitable safety valve 28, is placed on one end of the reservoir 25 and from the other end, an air pipe 29, leads to a two way valve 30, which is rotated by means of a stem 31. The valve 30 is rotatably mounted in a casing 32, provided with suitable ports 33, 34, and 35, and the valve is provided with a transverse bore 36, and the intersecting bore 37. The port 33 alines with the air pipe 29, the port 34, opens to the atmosphere and the port 35 alines with the pipe 27. A pipe 38 leads from the reservoir 25 and extends to a cylinder 39, in which is arranged a piston 40.

The shaft 3, also passes rotatably through a slidable block 41, which is slotted obliquely as shown at 42, the shaft 3, resting loosely in the said slot. A piston 43, is connected to the sliding block 41, the said block moving upon a bracket 44, and the piston rod 43, which is connected to the piston 40, is encircled within the cylinder 39, by a spring 46, which bears at one end upon the piston 40 and normally holds the piston toward the forward end of the cylinder 39. A suitable foot lever 47, is connected by means of links 48, to the shaft 3 and when the lever 47, is pushed forward the shaft 3, is moved along the slot of the bearings 4 and the gear wheel 5, is disengaged from the gear wheel 2.

The operation of the device is as follows:— When the valve is turned into the position shown in Figs. 6 and 7 air will be compressed in the cylinder 11, and will pass through the pipe 26, the reservoir 25 and through the pipe 27 to the brake cylinder 23, moving the piston 22 forward and applying the brakes. Should the air pressure in the reservoir 25, exceed a predetermined limit, as for example six pounds, the piston 4, in the cylinder 39 will force rearward against the tension of the spring 46, as it will be noted that the cylinder 39, is in communication with the reservoir 25, through pipe 38. This rearward movement of the piston 40, in the cylinder 39, will move the piston rod 43, rearward, which will also move the block 41, rearward and as the shaft 3 passes loosely through the slot 42, of this block, such rearward movement of the block will lift the shaft 3, upwardly in the bearings 4, against the tension of the spring, 6, and the gear wheel 5, will be disengaged from the gear wheel 2 and the pumping operation in the cylinder 11 will cease. The brakes can also be released by giving the valve 30 a quarter of a revolution, throwing the bore 36, in alinement with the port 34, and the bore 37 in alinement with the port 33.

Having thus fully described my invention, what I claim as new and desire to secure by Letters Patent, is:—

1. The combination with an air brake for wagons, a gear wheel carried by an axle of the wagon, curved and slotted brackets, a shaft slidably journaled in the slots of said brackets, a gear wheel carried by said shaft adapted to mesh with the gear wheel first mentioned, a disk carried also by the slidable shaft, an air cylinder, a piston therein, a piston rod pivotally connected to the disk, and springs arranged in the slots of the brackets and bearing upon the shaft journaled in said slots for the purpose of holding the gear wheel carried by the shaft in engagement with the gear wheel of the axle.

2. The combination with a vehicle, of a gear wheel, carried thereby and adapted to rotate in unison with a wheel of the vehicle, a shaft, curved slotted bearings in which the said shaft is slidably journaled, a gear wheel carried by said shaft and adapted to mesh with the first mentioned gear wheel, an air compressor, means connected to the shaft for compressing air during rotation of said shaft, a reservoir adapted to receive air from the compressor, brake actuating devices operable by compressed air from the reservoir, a cylinder having communication with the reservoir, a piston therein, a piston rod, a coil spring within the cylinder encircling the piston rod, a slidable block obliquely slotted, said block being movable by the said piston rod, and the shaft before mentioned passing loosely through the slot of the said block and adapted to be moved along the slots of the shaft bearings when the block is moved, thereby lifting the gear wheel carried by the shaft from engagement with the gear wheel carried by the vehicle when the piston is moved against the tension of its spring by pressure of air from the reservoir.

3. The combination with a vehicle, of a gear wheel carried by the vehicle, and rotatable by movement of the vehicle, a shaft slidably held in suitable bearings, a gear wheel on the shaft adapted to mesh with the first mentioned gear wheel, a disk on the shaft, a cylinder, a piston therein, said cylinder being provided with openings in one end, check valves carried by the piston, a pitman pivotally connecting said piston to the disk, a pipe leading from the end of the cylinder opposite the disk, a check valve in said pipe, a reservoir into which said pipe opens, brake actuating devices, operable by compressed air from the said reservoir, a cylinder having a spring pressed piston therein, a valve casing, pipe leading from the reservoir and from the last mentioned cylinder to said casing, a valve adapted to place said pipes into communication with each other, and means whereby movement of the piston last mentioned against the tension of its spring slides the shaft in its bearings and disengages the gear wheels.

ORAH T. BEATTY.

Witnesses:
J. W. FLEMING,
THOMAS S. FILSON.